Sept. 21, 1954

C. P. WEST 2,689,898

DRAWOUT SWITCHGEAR

Filed April 28, 1951

WITNESSES:
Robert C. Baird
Leon J. Laza

INVENTOR
Charles P. West.
BY
ATTORNEY

Sept. 21, 1954     C. P. WEST     2,689,898
DRAWOUT SWITCHGEAR
Filed April 28, 1951     4 Sheets-Sheet 2
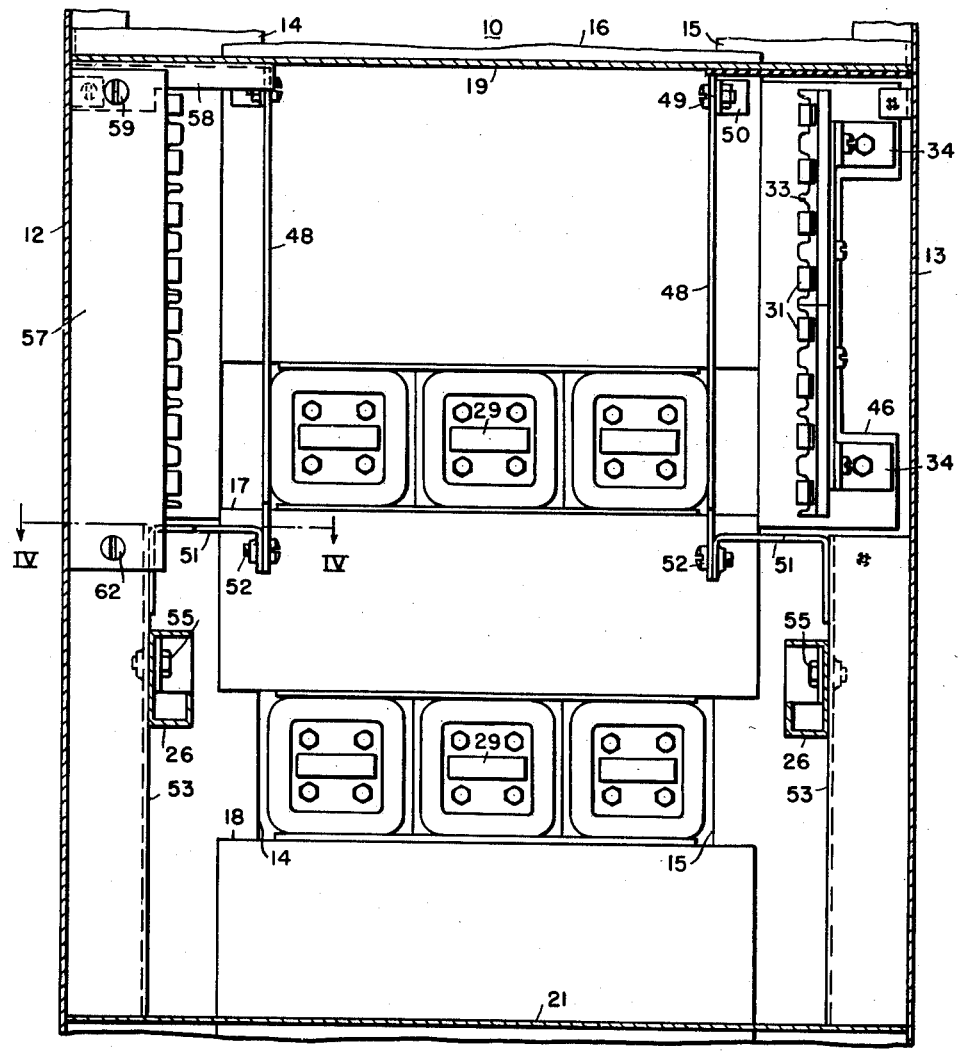
Fig.3.
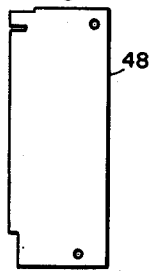
Fig.8.
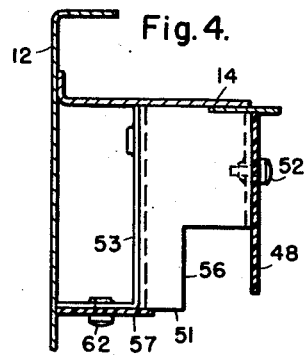
Fig.4.
Fig.9.
INVENTOR
Charles P. West.
BY
ATTORNEY Sept. 21, 1954  C. P. WEST  2,689,898
DRAWOUT SWITCHGEAR
Filed April 28, 1951  4 Sheets-Sheet 3

WITNESSES:

INVENTOR
Charles P. West.
BY
ATTORNEY

Sept. 21, 1954  C. P. WEST  2,689,898
DRAWOUT SWITCHGEAR
Filed April 28, 1951  4 Sheets-Sheet 4

WITNESSES:
Robert C. Baird
Leon J. Laza

INVENTOR
Charles P. West.
BY
ATTORNEY

Patented Sept. 21, 1954

2,689,898

UNITED STATES PATENT OFFICE 2,689,898

DRAWOUT SWITCHGEAR

Charles P. West, Forest Hills, Pa., assignor to Westinghouse Electric Corporation, East Pittsburgh, Pa., a corporation of Pennsylvania Application April 28, 1951, Serial No. 223,563

8 Claims. (Cl. 200—168)

My invention relates, generally, to switchgear apparatus and, more particularly, to secondary disconnecting contacts for metal-enclosed switchgear.

In metal-enclosed switchgear having circuit breakers of the draw-out type, it is the usual practice to provide secondary disconnecting contacts for the control circuit wires which are electrically connected to each draw-out circuit breaker unit. Since the secondary contacts are usually located in the same compartment with the primary disconnecting contacts, it is desirable to isolate the secondary contacts from the primary contacts.

An object of my invention, generally stated, is to provide a metal-enclosed switchgear structure which shall be simple and efficient in operation and which may be economically manufactured and installed.

A more specific object of my invention is to provide for isolating the secondary disconnecting contacts for a draw-out circuit breaker unit from the primary disconnecting contacts for the breaker unit.

A further object of my invention is to provide secondary disconnecting contacts which are enclosed when the circuit breaker is in the operating position in the cell and exposed when the breaker is withdrawn from the cell.

Another object of my invention is to complete the enclosure for the secondary disconnecting contacts by moving the circuit breaker into the operating or connected position in the cell.

A still further object of my invention is to provide enclosed secondary disconnecting contacts which are visible from in front of the cell as the contacts are engaged or disengaged by moving the circuit breaker unit into or out of the cell.

Other objects of my invention will be explained fully hereinafter or will be apparent to those skilled in the art.

In accordance with my invention, barriers are so mounted in the cell and on the removable circuit breaker unit that the secondary disconnecting contacts are enclosed by the barriers when the breaker unit is moved into the connected or operating position in the cell, thereby isolating the secondary disconnecting contacts from the primary disconnecting contacts. Certain of the barriers may be composed of a transparent insulating material, thereby making the secondary contacts visible as they are engaged or disengaged.

For a better understanding of the nature and objects of my invention, reference may be had to the following detailed description, taken in conjunction with the accompanying drawings in which:

Fig. 3 is a view, partly in front elevation and partly in section, of the cell or cubicle for the removable circuit breaker unit;

Fig. 4 is a view, in section, taken along the line I—IV in Fig. 3;

Figs. 8 and 9 are reduced views in elevation, of two of the barriers utilized for enclosing the secondary disconnecting contacts.

Figure 1:
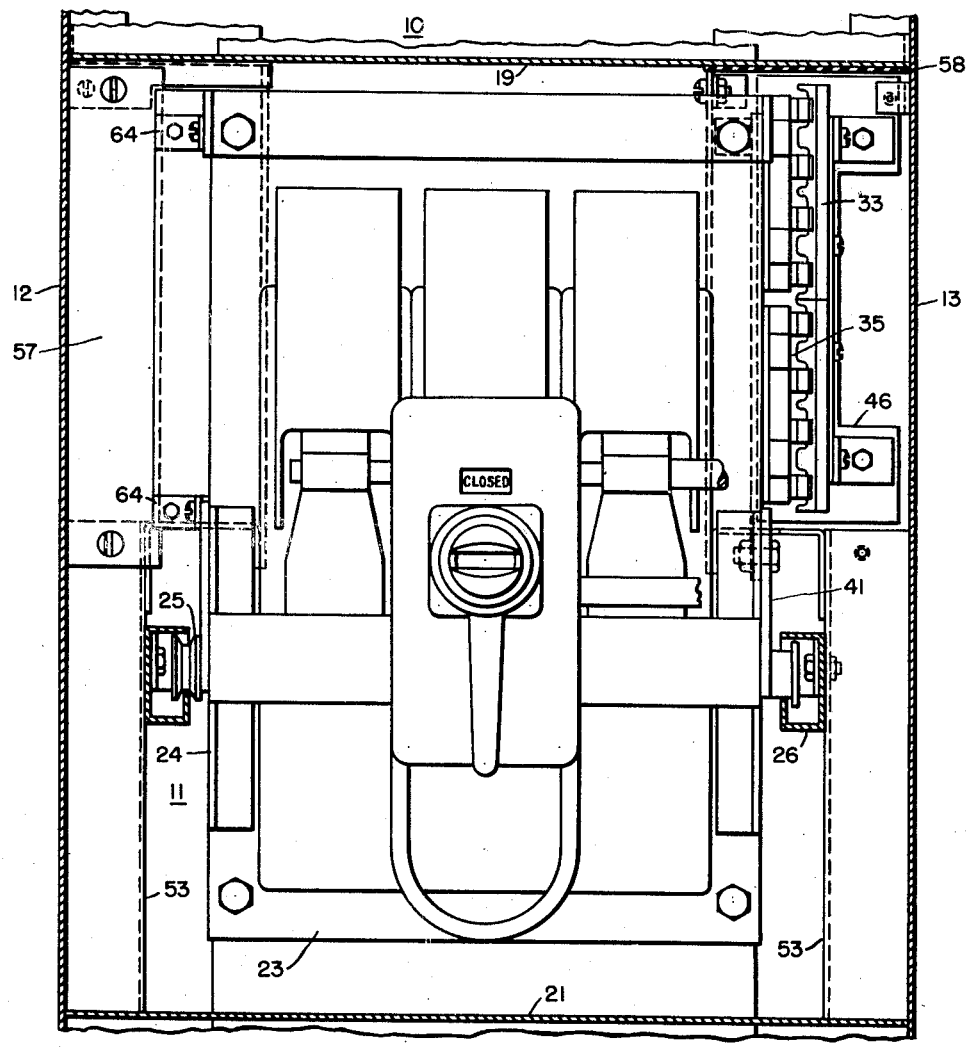
Figure 1 is a view, partly in section and partly in front elevation, of a switchgear structure embodying the principal features of the invention.

Referring to the drawing, and particularly to Figs. 1 and 3, the structure shown therein comprises a metal enclosed switchgear cell or cubicle 10 in which is disposed a circuit breaker unit 11. The cubicle 10 may be part of a metal-enclosed switchgear unit which may be of the usual construction. As shown, the cubicle 10 comprises side sheets 12 and 13, angle members 14 and 15 which are attached to the side sheets 12 and 13, respectively, metal plates 16, 17 and 18 which are attached to the angle members 14 and 15, a top wall 19 and a bottom wall 21. A door (not shown) is provided at the front of the cubicle, thereby completing the enclosure for the circuit breaker unit.

As described in my copending application, Serial No. 223,564, filed April 28, 1951, the circuit breaker unit 11 is of the horizontal draw-out type. The circuit breaker unit comprises a circuit breaker 22 which is mounted in a carriage comprising a flanged panel 23 and side members 24 which are attached to the panel 23. The circuit breaker unit is supported by rollers 25 which are attached to the side members 24. The rollers 25 run on rails 26 disposed at the sides of the cubicle.

Figure 5:
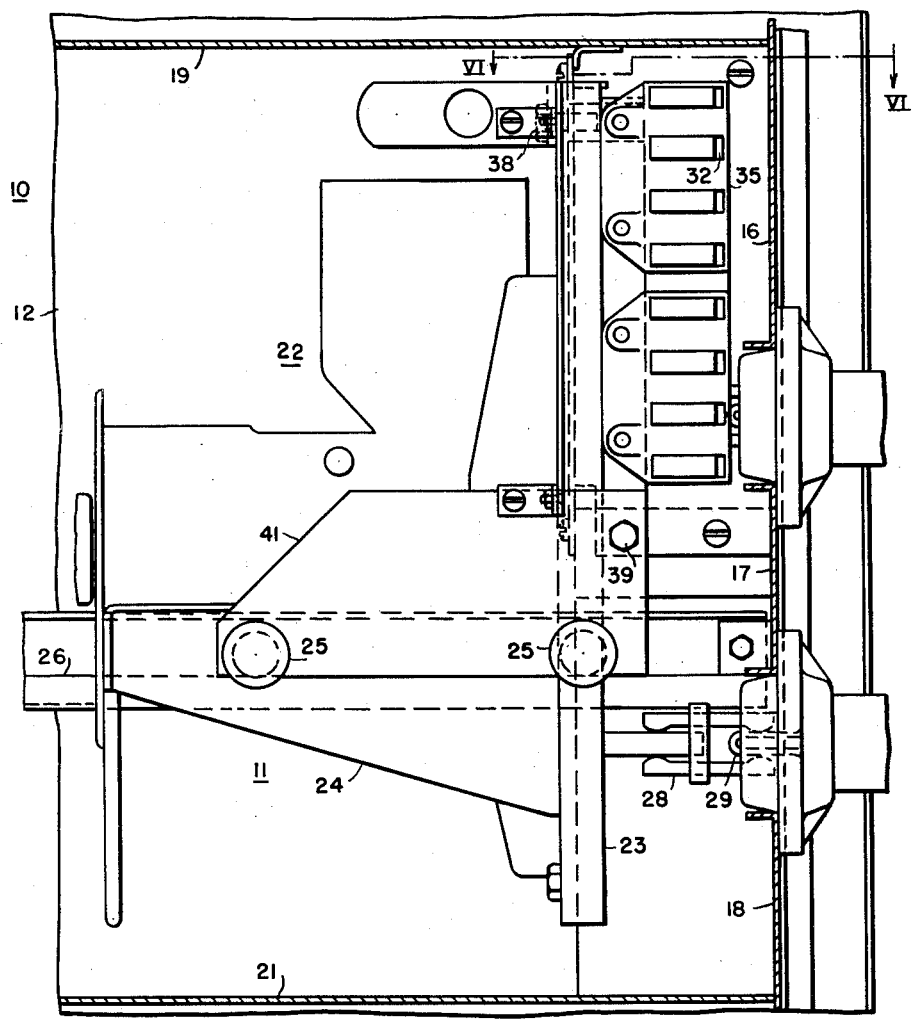
Fig. 5 is a view, partly in side elevation and partly in section, of the structure shown in Fig. 1, the circuit breaker unit being in the connected or operating position in the cell.
Figure 7:
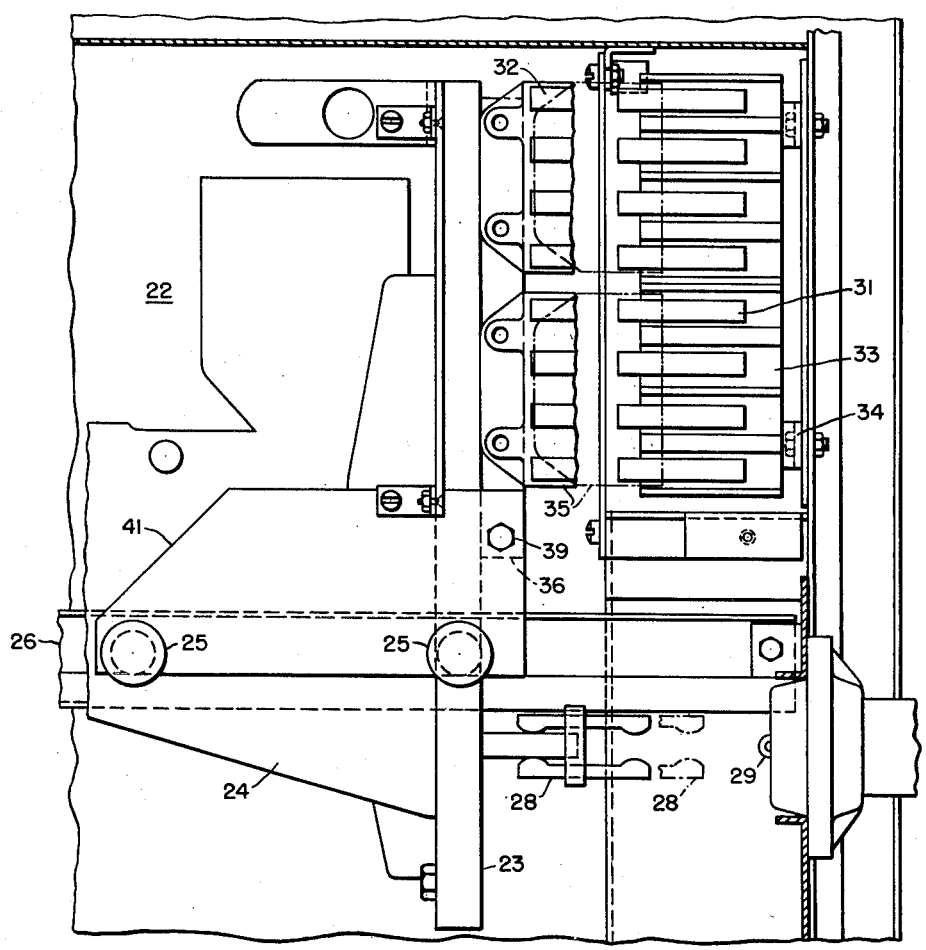
Fig. 7 is a view, similar to Fig. 5, showing the circuit breaker unit in the disconnected position.

As described in the aforesaid copending application, the breaker unit may be moved between the disconnected position in the cubicle and the connected or operating position by means of a drive mechanism which is fully described in the aforesaid copending application. When the circuit breaker unit is in the connected or operating position, as shown in Fig. 5, primary disconnect contact members 28 which are carried by the circuit breaker unit engage fixed contact members 29 which are mounted at the rear of the cubicle 10. When the circuit breaker unit is in the disconnected position, as shown in Fig. 7, the disconnect contact members 28 are disengaged from the contact members 29. The contact members 28 are also disengaged from the contact members 29 when the circuit breaker unit is in the test position, as shown by the broken lines in Fig. 7.

Figure 6:
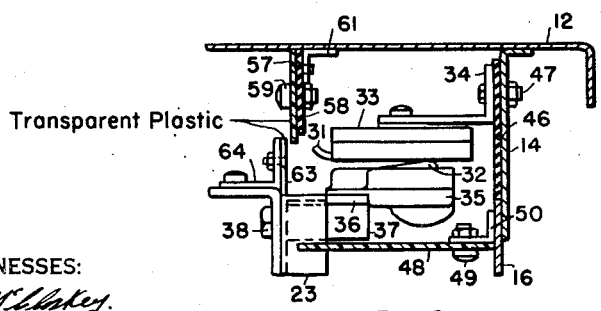
Fig. 6 is a view, in section, taken along the line VI—VI in Fig. 5.

As explained hereinbefore, it is the usual practice to provide removable circuit breaker units of the present type with secondary disconnecting contact members for establishing the control circuits to the circuit breaker unit. As shown in Figs. 3 and 6, the secondary disconnecting contacts comprise fixed contact members 31 and movable contact members 32.

The fixed contact members 31 are mounted in bases 33 which are attached to the angle member 14 or the angle member 15 by angle brackets 34. The movable contact members 32 are mounted in bases 35 which are carried by the circuit breaker unit 11. The bases 35 may be attached to a metal strip 36 which is attached to the panel 23 at the top by means of a spacing member 37 and a screw 38, and at the bottom by means of a screw 39 which extends through a plate 41 which may be welded to the panel 23 and the side members 24.

Figure 2:
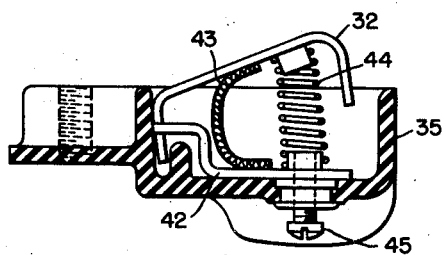
Fig. 2 is an enlarged detail view of one of the secondary disconnecting contact members carried by the circuit breaker unit.

As shown in Fig. 2, each contact member 32 is pivotally mounted on a terminal member 42 in the base 35 and is electrically connected to the member 42 by a flexible shunt 43. The contact member 32 is biased away from the member 42 by a spring 44 which is compressed when the contact member 32 engages its cooperating contact member 31 in the cubicle. A terminal screw 45 is provided for connecting a wire to the terminal member 42. Similar means may be provided for connecting wires to the fixed contact members 31, thereby establishing control circuits through the secondary contact members when they are engaged.

Figures 10, 11:
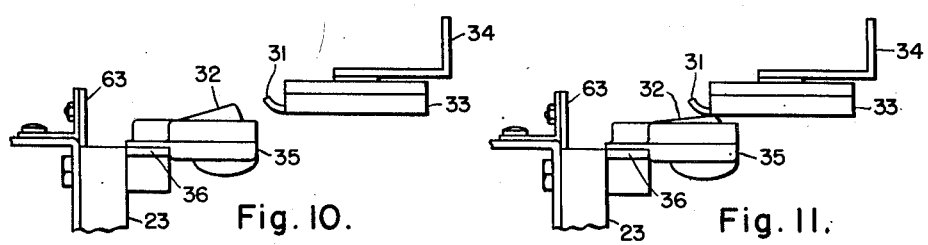
Figs. 10 and 11 are detail views, in plan, showing the secondary disconnect contact members in the disconnected and the test positions, respectively.

As shown in Fig. 10, the secondary disconnecting contact members are disengaged when the breaker unit is in the disconnected position. Thus, the circuits through both the primary disconnecting contact members and the secondary disconnecting contact members are opened when the breaker unit is in the disconnected position.

As shown in Fig. 11, the secondary contact members are engaged when the breaker unit is in the test position. As explained hereinbefore, the primary disconnecting contact members are disengaged when the breaker unit is in the test position. Accordingly, the operation of the circuit breaker may be tested by means of the circuits established through the secondary disconnecting contact members without the circuits through the primary disconnecting contact members being established when the breaker unit is in the test position.

As explained hereinbefore, it is desirable to isolate the secondary disconnecting contact members from the primary disconnecting contact members when the breaker unit is in the connected or operating position. However, it is also desirable to enable the operator to see when the secondary contact members are engaged or disengaged as the breaker unit is being moved into or out of the cell.

I have accomplished the foregoing by providing insulating barriers in the cell and on the breaker unit which are so disposed that the secondary disconnecting contact members are enclosed when the breaker unit is moved into the operating position. As shown most clearly in Fig. 6, an insulating barrier 46 is disposed between the secondary disconnecting contact members and the angle member 14. The barrier 46 may be attached to the angle member 14 by bolts 47 which also attach the clips 34 to the angle members 14. As shown in Fig. 3, an insulating barrier 48 is disposed between the secondary disconnecting contact members and the fixed primary disconnecting contact members 29 in the cubicle. The barrier 48 may be attached at the top to the metal plate 16 by means of a bolt 49 and an angle clip 50 which may be welded to the metal plate 16. The barrier 48 may be attached at the bottom to a metal bracket 51 by means of a bolt 52.

As shown most clearly in Figs. 3 and 4, the bracket 51 may be attached to a wiring gutter 53 by means of spot welding. The wiring gutter 53 may be attached to the rail 26 by means of a bolt 55. The bracket 51 functions as a support for the barrier 48 and also forms the bottom member of the enclosure for the secondary contact members. As shown in Fig. 4 the bracket 51 is notched out at 56 to permit the breaker unit to be inserted into the cell.

An insulating barrier 57 is disposed at the front of the secondary contact members 31. The barrier 57 may be attached at the top to an angle-shaped barrier 58 by means of a bolt 59. The barrier 58 may be attached to the side wall 12 by an angle clip 61. The barrier 57 may be attached at the bottom to the wiring gutter 53 by means of a screw 62.

Another barrier 63 may be attached to the circuit breaker unit by means of angle clips 64. As shown most clearly in Fig. 6, the barrier 63 overlaps the barrier 57 when the circuit breaker unit is in the connected position to complete the enclosure for the secondary contact members. As shown in Figs. 10 and 11, the barrier 63 moves with the circuit breaker unit as the unit is withdrawn from the operating position.

As indicated in Fig. 6, the barriers 57 and 63 are preferably composed of a transparent plastic, thereby enabling the operator to see when the secondary contact members 31 and 32 are engaged or disengaged as the breaker is moved into or out of the cell, it being understood that the operator stands in front of the cell while operating the drive mechanism for moving the breaker into the cell.

In this manner, the secondary contact members are completely enclosed when the breaker unit is moved into the cell, thereby isolating the secondary contact members from the primary disconnecting contact members when the breaker unit is in the operating position. However, the secondary contact members are visible from in front of the cell, thereby enabling the operator to tell when they are engaged.

As shown in the drawings, secondary contact members are provided at each side of the cell and the breaker unit. Both sets of contact members are enclosed in the manner described by similar barriers at each side of the cell and on the breaker unit.

From the foregoing description, it is apparent that I have provided for isolating the secondary disconnecting contact members from the primary disconnecting contact members in a metal-enclosed cubicle. However, the isolating barriers are so disposed that the contact members are accessible when the breaker unit is withdrawn from the cubicle. By making certain of the barriers of a transparent material, the contact members may be made visible when the breaker unit is in the cell. Thus, the contact members are protected and at the same time the operator is enabled to tell when they are properly engaged.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a switchgear structure in combination, a cell, a circuit breaker unit disposed in the cell and movable between test and connected positions, fixed primary disconnect contact members mounted at the rear of the cell, movable primary disconnect contact members carried by the circuit breaker unit and engaging the fixed primary contact members in the cell when the breaker unit is in the connected position, fixed secondary disconnect contact members mounted at a side of the cell and adjacent to said fixed primary disconnect contact members, movable secondary disconnect contact members carried by the breaker unit and engaging the fixed secondary contact members in the cell when the breaker unit is in the test and the connected positions, fixed barriers cooperating with a side of the cell to form part of a generally rectangular enclosure for the secondary contact members, and a barrier carried by the breaker unit and cooperating with the barriers in the cell to complete said enclosure to isolate the secondary disconnect contact members from the primary disconnect contact members.

2. In a switchgear structure in combination, a cell, a circuit breaker unit disposed in the cell and movable between test and connected positions, fixed primary disconnect contact members mounted at the rear of the cell, movable primary disconnect contact members carried by the circuit breaker unit and engaging the fixed primary contact members in the cell when the breaker unit is in the connected position, fixed secondary disconnect contact members mounted at a side of the cell and adjacent to said fixed primary disconnect contact members to be visible from in front of the cell, movable secondary disconnect contact members carried by the breaker unit and engaging the fixed secondary contact members in the cell when the breaker unit is in the test and the connected positions, fixed barriers cooperating with a side of the cell to form part of a generally rectangular enclosure for the secondary contact members, and barriers carried by the breaker unit and cooperating with the barriers in the cell to complete said enclosure to isolate the secondary disconnect contact members from the primary disconnect contact members when the breaker unit is moved into the connected position in the cell.

3. In a switchgear structure in combination, a cell, a circuit breaker unit disposed in the cell and movable between test and connected positions, fixed primary disconnect contact members mounted at the rear of the cell, movable primary disconnect contact members carried by the circuit breaker unit and engaging the fixed primary contact in the cell when the breaker unit is in the connected position, fixed secondary disconnect contact members mounted at a side of the cell and adjacent to said fixed primary disconnect contact members, movable secondary disconnect contact members carried by the breaker unit and engaging the fixed secondary contact members in the cell when the breaker unit is in the test and the connected positions, fixed barriers disposed in the cell to form part of a generally rectangular enclosure for the secondary disconnect contact members, and a barrier carried by the breaker unit and cooperating with the barriers in the cell to complete the enclosure for the secondary disconnect contact members.

4. In a switchgear structure in combination, a cell, a circuit breaker unit disposed in the cell and movable between test and connected positions, fixed primary disconnect contact members mounted at the rear of the cell, movable primary disconnect contact members carried by the circuit breaker unit and engaging the fixed primary contact members in the cell when the breaker unit is in the connected position, fixed secondary disconnect contact members mounted at a side of the cell in a vertical row adjacent to said fixed primary disconnect contact members, movable secondary disconnect contact members mounted on the side of the breaker unit in a vertical row and engaging the fixed secondary contact members in the cell when the breaker unit is in the test and the connected positions, fixed barriers disposed in the cell to form part of a generally rectangular enclosure for the secondary disconnect contact members, and a barrier carried by the breaker unit and cooperating with the barriers in the cell to complete the enclosure for the secondary disconnect contact members when the breaker unit is moved to the connected position in the cell.

5. In a switchgear structure in combination, a cell, a circuit breaker unit disposed in the cell and movable between test and connected positions, fixed primary disconnect contact members mounted in the cell, movable primary disconnect contact members carried by the circuit breaker unit and engaging the fixed primary contact members in the cell when the breaker unit is in the connected position, fixed secondary disconnect contact members mounted toward the rear and at a side of the cell outside the area covered by the breaker unit to be visible from in front of the cell when the breaker unit is in the cell, movable secondary disconnect contact members carried by the breaker unit and engaging the fixed secondary contact members in the cell when the breaker unit is in the test and the connected positions, fixed barriers disposed in the cell to form part of a generally rectangular enclosure for the secondary contact members, and a barrier carried by the breaker unit and cooperating with the barriers in the cell to complete said enclosure to isolate the secondary disconnect contact members from the primary disconnect contact members, at least part of said barriers being transparent to make the secondary contact members visible from in front of the cell as they are being actuated into engagement or disengagement by moving the breaker unit.

6. In a switchgear structure in combination, a cell, a circuit breaker unit disposed in the cell and movable between test and connected positions, fixed primary disconnect contact members mounted in the cell, movable primary disconnect contact members carried by the circuit breaker unit and engaging the fixed primary contact members in the cell when the breaker unit is in the connected position, fixed secondary disconnect contact members mounted toward the rear and at a side of the cell outside the area covered by the breaker unit to be visible from in front of the cell when the breaker unit is in the cell, movable secondary disconnect contact members carried by the breaker unit and engaging the fixed secondary contact members in the cell when the breaker unit is in the test and the connected positions, fixed barriers disposed in the cell to form part of an enclosure for the secondary disconnect contact members, and a barrier carried by the breaker unit and cooperating with the barriers in the cell to complete the enclosure for the secondary disconnect contact members, at least part of said barriers being transparent to make the secondary contact members visible from in front of the cell as they are being actuated into engagement or disengagement by moving the breaker unit.

7. In a switchgear structure in combination, a cell, a circuit breaker unit disposed in the cell and movable between test and connected positions, fixed primary disconnect contact members mounted in the cell, movable primary disconnect contact members carried by the circuit breaker unit and engaging the fixed primary contact members in the cell when the breaker unit is in the connected position, fixed secondary disconnect contact members mounted toward the rear and at a side of the cell, movable secondary disconnect contact members carried by the breaker unit and engaging the fixed secondary contact members in the cell when the breaker unit is in the test and the connected positions, and spaced barriers disposed in the cell to form part of a generally rectangular enclosure for the secondary disconnect contact members, said breaker unit completing the enclosure for the secondary disconnect contact members when the breaker unit is moved to the connected position in the cell.

8. In a switchgear structure in combination, a cell, a circuit breaker unit disposed in the cell and movable between test and connected positions, fixed primary disconnect contact members mounted in the cell, movable primary disconnect contact members carried by the circuit breaker unit and engaging the fixed primary contact members in the cell when the breaker unit is in the connected position, fixed secondary disconnect contact members mounted toward the rear and at a side of the cell, movable secondary disconnect contact members mounted on the side of the breaker unit and engaging the fixed secondary contact members in the cell when the breaker unit is in the test and the connected positions, and spaced barriers disposed in the cell to form part of a generally rectangular enclosure for the secondary disconnect contact members, said breaker unit having means thereon for completing the enclosure for the secondary disconnect contact members when the breaker unit is moved to the connected position in the cell.

References Cited in the file of this patent

UNITED STATES PATENTS

| Number | Name | Date |
|---|---|---|
| 1,869,856 | MacNeil | Aug. 2, 1932 |
| 2,129,723 | Wood | Sept. 13, 1938 |
| 2,311,637 | Buchanan | Feb. 23, 1943 |
| 2,388,934 | Pearson | Nov. 13, 1945 |